(12) United States Patent
Le Pallec et al.

(10) Patent No.: US 8,588,258 B2
(45) Date of Patent: Nov. 19, 2013

(54) AUTOMATIC MANAGEMENT OF TIMESTAMP-BASED SYNCHRONISATION PROTOCOLS

(75) Inventors: Michel Le Pallec, Nozay (FR); Dinh Thai Bui, Nozay (FR)

(73) Assignee: Alcatel Lucent, Paris (FR)

( * ) Notice: Subject to any disclaimer, the term of this patent is extended or adjusted under 35 U.S.C. 154(b) by 283 days.

(21) Appl. No.: 12/960,936

(22) Filed: Dec. 6, 2010

(65) Prior Publication Data

US 2011/0150008 A1 Jun. 23, 2011

(30) Foreign Application Priority Data

Dec. 9, 2009 (EP) ..................................... 09290920

(51) Int. Cl.
*H04L 12/28* (2006.01)
*H04J 1/16* (2006.01)
(52) U.S. Cl.
USPC .......................................... 370/516; 370/282
(58) Field of Classification Search
USPC .................. 370/503–520, 282; 709/248, 375; 375/354–376
See application file for complete search history.

(56) References Cited

U.S. PATENT DOCUMENTS

| | | | | |
|---|---|---|---|---|
| 6,665,315 B1 * | 12/2003 | Karasawa | ...................... | 370/508 |
| 6,922,417 B2 * | 7/2005 | Vanlint | .......................... | 370/503 |
| 7,418,510 B2 * | 8/2008 | Sakakura | ....................... | 709/229 |
| 7,729,290 B2 * | 6/2010 | Saleh et al. | .................... | 370/254 |
| 8,031,747 B2 * | 10/2011 | Barry et al. | ..................... | 370/516 |
| 8,082,371 B2 * | 12/2011 | Zinke et al. | ..................... | 710/18 |
| 8,274,999 B2 * | 9/2012 | Shenoi et al. | ................. | 370/503 |
| 2007/0177589 A1 * | 8/2007 | Endo | .............................. | 370/389 |
| 2008/0225897 A1 | 9/2008 | Bryant et al. | | |
| 2010/0020829 A1 | 1/2010 | Ruffini | | |

FOREIGN PATENT DOCUMENTS

WO WO 2008/051123 5/2008

OTHER PUBLICATIONS

Le Pallec et al.; "Time and Frequency Distribution Over Packet Switched Networks", Bell Labs Technical Journal, Wiley, CA, US, vol. 14, No. 2 (pp. 131-153), published Jul. 1, 2009.
Bui et al.; "Packet Delay Variation Management for a Better IEEE1588V2 Performance", Precision Clock Synchronization for Measurement, Control and Communication, 2009. ISPCS 2009. International Symposium on IEEE, Piscataway, NJ, USA, (pp. 1-6) Oct. 12, 2009.

\* cited by examiner

*Primary Examiner* — John Pezzlo
(74) *Attorney, Agent, or Firm* — Harness, Dickey & Pierce

(57) ABSTRACT

A method for automatic management of a timestamp-based synchronization protocol within a packet-based network to synchronize a slave within a synchronization topology including a plurality of masters, the slave clock being locked to a master clock at an initialization time, said method comprising an assessment step of end-to-end packet delay variation on the basis of the slave clock accuracy, over a plurality of (slave, path, master) combinations, each path linking the slave to a master.

9 Claims, 2 Drawing Sheets

AUTOMATIC MANAGEMENT OF TIMESTAMP-BASED SYNCHRONISATION PROTOCOLS

The present invention relates to timestamp-based synchronization protocols within packet-based networks.

BACKGROUND OF THE INVENTION

As telecommunication data transmission is increasingly reliant on packet-based networks (e.g. Ethernet, ATM, PSN), robust methods for time and frequency synchronization between certain nodes of these networks are required. By synchronization, a way of distributing common time and frequency references to networked devices (or nodes), in order to align their time and frequency scales, is meant.

For example, Wireless networks reveal such requirement at the air/radio interface with usual values below 50 ppb (parts per billion) and 1 µs (micro second) targets, respectively, for frequency and time accuracies. At the network level (e.g. at the input of the radio Base Station), a synchronization accuracy around 16 ppb or even less is usually quested.

In this regard, timestamp-based synchronization protocols are widely adopted, typically as the IEEE 1588V2 standard (also known as PTPV2 for Precision Time Protocol Version 2) or the IETF Network Time Protocol Version 4 (NTPV4). Such synchronization protocols are in charge of aligning the time (respectively the frequency) of at least a network node, commonly designated as Slave, to the time (respectively to the frequency) of another node, commonly designated as Master. To that end, these synchronization protocols are constrained to measure the path delay (or even the roundtrip delay) introduced by the network path linking the source (Master/Slave) to the destination (Slave/Master).

Hence, synchronization protocol performances may be directly affected by Packet Delay Variation (PDV) along the Master-to-Slave and/or Slave-to-Master network path. Different traffic load conditions, the number of hops (e.g. switches, routers), networks links capacities, route changes and other hardware taking place between the Master clock and the Slave clock are mainly at the origin of such delay/Packet Delay Variation.

Typically, with a well defined floor delay, the larger the PDV, the more pronounced noising effect on synchronization protocol performances. Accordingly, PDV over packet-based networks has a direct impact on performances of time and frequency packet transfer protocols.

The key performance factor to accurately assure compliance to packet-based network synchronization requirements is the whole management of PDV, in other words an End-to-End PDV management.

However,
either the PDV per network hop/segment management, followed by End-to-End PDV deduction—even if PDV is not strictly additive—;
or the PDV measurement of all (Slave, Path, Master) combinations;
require the deployment of specific resources and monitoring tools within the network in order to measure all End-to-End (E2E) PDVs or network hops. Moreover, such static and conservative approaches are not well-suited to ubiquitously dynamic environments as Packet-Switched Networks (PSN). Indeed, the network traffic (especially for the mobile backhaul with 3G and 4G evolutions) is continuously increasing, considering that demanding increase in bandwidth meets targeted services (Triple Play Service Delivery Architecture). This traffic increase has a direct impact on PDV and, consequently, on the per-PDV-domain synchronization topology organization.

This means that packet-based networks operators have to regularly
monitor their network traffic load and the related induced PDV; and accordingly
review the synchronization topology organization.

Such burden is a complex task, as well as it requires an important operating expense proportional to the complexity of the synchronization topology.

A "free-PDV" IEEE1588V2 topology, commonly known as IEEE 1588V2P2P TC (Peer-to-Peer Transparent Clocks) or IEEE 1588V2 E2E TC (End-to-End Transparent Clocks), permits to correct the delay in one-way direction in real-time. Nevertheless, this approach requires the deployment of a plurality of complex hardware all over the network nodes within the synchronization topology which may discourage its adoption over wide or deep synchronization topologies.

Carefully monitoring PDV, experienced by timing packets, by applying relevant Quality of Service (QoS) policies on the network (e.g. by prioritizing timing flows) may respond to the evoked difficulties. However, QoS does not permit to suppress completely the PDV as ultimately there is always competition between PTP flows within the premium queue and there are always competitions between PTP packets and best-effort or data traffic when it comes closed to the transmission medium. Moreover, an end-to-end QoS management is not always available for multiple reasons as networks heterogeneity or QoS policies variability per networks segments. Moreover, this approach would engender difficult situations for networks operators, especially in high traffic load situations (e.g. impossibility to redirect the traffic, traffic equity). But above all, the relationship between QoS rules and PDV ranges has to be clearly demonstrated before any deployment of such solution.

One object of the present invention is therefore to provide a migration way for networks operators targeting an autonomous management of their synchronization network while keeping a full control of it.

Another object of the present invention is to jointly allow monitoring and controlling synchronization performances by measuring/assessing the PDV over synchronization network.

Another object of the present invention is to automatically achieve best performances of timestamp-based synchronization protocols over a given synchronization topology.

Another object of the present invention is to provide a global PDV management over a synchronization topology with a given Slave synchronized to a Master.

Another object of the present invention is to reduce the impact of PDV on the accuracy of time and frequency packet transfer protocols.

Another object of the present invention is to enhance frequency and time distribution protocol performances over wide-area Ethernets, Packet-Switched Networks (PSNs) and Circuit Emulation Services (CES).

Another object of the present invention is to support the deployment, over distributed packet-based networks, applications that require precise time and/or frequency synchronization.

Another object of the present invention is to automatically identify and configure, upon operator acknowledgement, the relevant synchronization topology, whatever the traffic load scenario.

Another object of the present invention is to provide an automatic timekeeping within distributed clock synchronization in packet-based networks.

Another object of the present invention is to provide a per-PDV domain organization of synchronization topology in automatic and self management manner.

Another object of the present invention is to optimize the signaling message rate used for PDV assessment, while keeping high PDV confidence range.

DESCRIPTION OF THE DRAWING

The objects, advantages and other features of the present invention will become more apparent from the following disclosure. The following non-restrictive description of a preferred embodiment of the invention is given for the purpose of exemplification only with reference to the accompanying drawing in which.

SUMMARY OF THE INVENTION

Figure 1:
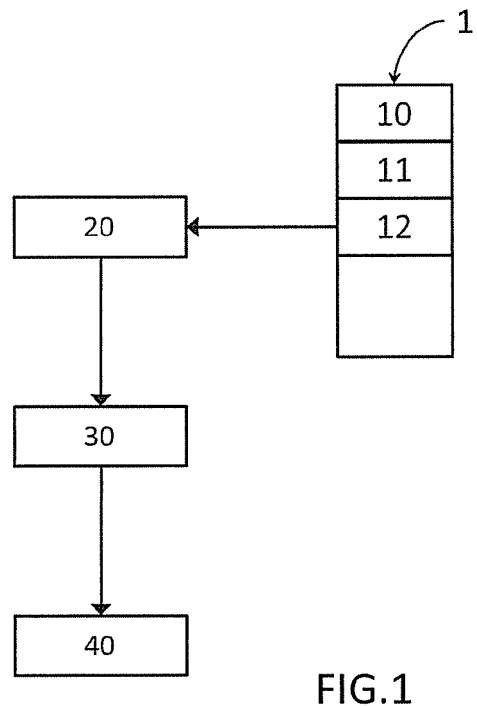
FIG. 1 is a schematic diagram illustrating functional modules according to one embodiment.

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key of critical elements of the invention or to delineate the scope of the invention. Its sole purpose is to present some concepts in a simplified form as a prelude to the more detailed description that is discussed later.

The present invention relates to a method for automatic management of a timestamp-based synchronization protocol within a packet-based network to synchronize a slave within a synchronization topology including a plurality of masters, the slave clock being locked to a master clock at an initialization time, said method comprising an assessment step of end-to-end packet delay variation on the basis of the slave clock accuracy, over a plurality of (slave, path, master) combinations, each path linking the slave to a master.

The present invention further relates to an apparatus for automatic management of a timestamp-based synchronization protocol within a packet-based network to synchronize a slave within a synchronization topology including a plurality of masters, the slave clock being locked to a master clock at an initialization time, said apparatus comprising
  a centralized database system provided with a traffic engineering database, an unified synchronization database including at least a synchronization topology, and at least a topological requirements;
  an end-to-end packet delay variation assessment module for end-to-end packet delay variation assessment on the basis of the slave clock accuracy, over a plurality of (slave, path, master) combinations, each path linking the slave to a master.

While the invention is susceptible to various modification and alternative forms, specific embodiments thereof have been shown by way of example in the drawings. It should be understood, however, that the description herein of specific embodiments is not intended to limit the invention to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DETAILED DESCRIPTION OF ILLUSTRATIVE EMBODIMENTS

Various embodiments of methods and systems described herein may be performed in a packet-based network provided with a timestamp-based synchronization protocol such as IEEE1588V2, or NTPV4. In such networks, slave clocks are generally locked to a frequency reference within a predetermined frequency accuracy (usually around 16 ppb) at t=0 which marks the initialization time of the herein described automatic management procedure of synchronization protocols.

Timestamp-based synchronization protocols describe temporal information exchange (with related methodologies) between distributed clocks in a segmented network into a Master-Slave synchronization hierarchy. Ordinary clocks operate as either a Master or a Slave and are located at the end points of the synchronization hierarchy paths which may include intermediate nodes of the underlying transport network. Routers, switches and repeaters are examples of such intermediate nodes, generally called network devices and which may—as well as may not—be synchronization protocol-aware. It is to be noted that intermediate nodes that are not synchronization protocol-enabled/aware certainly influence the whole performance of the synchronization protocol.

Based on this initial synchronization network topology, an automatic organization of PDV domains for the distribution of Time is addressed.

In this regard, an End-to-End (Master/"non protocol aware nodes"/Slave) PDV assessment methodology is targeted instead of a per-hop one (for which each node is a support for the synchronization protocol). In others words, in contrary to usual methods as IEEE1588V2-aware tools, embodiments described herein aim at an End-to-End (that is to say from a given Slave to a Master) PDV management.

It is to be noted that, in herein-described embodiments, a "Slave" refers either to a Slave clock or to a slave port (referring to a IEEE 1588V2 Boundary Clock for instance). Similarly, a "Master" refers to either a Master clock or a Master port (referring to a 1588V2 Boundary Clock for instance).

In one embodiment, a plurality of combinations (Path-Master) relative to a given Slave is assessed according to a predefined methodology. In other words, for a given Slave S (underlining designates a given Slave), a plurality of Masters Ms and a plurality of Paths Ps, respectively, linking this Slave S to Masters Ms are assessed then sorted from PDV standpoint. Then, for a given Slave S a plurality of triplets (S, P, M) extracted from the synchronization topology are to be assessed then sorted. End-to-End PDVs within each (S, P, M) combination is monitored/assessed thanks to the locked Slave S clocks.

With reference to FIG. 1, the End-to-End PDV management is achieved through a centralized database management system 1. In particular, each Slave S within the synchronization topology is configured to send PDV statistics to the centralized database management system 1.

The centralized database management system 1 includes:
  a Traffic Engineering Database (TED) 10 comprising, as non-limitative examples, the network topology, the network resources, hop count, statistics on delay and load behavior (jitter, loss probability, bit error rate), QoS policies, economic cost, administrative weight;

an unified synchronization database 11 comprising synchronization topologies according to employed synchronization protocols (SyncE, NTPV4, IEEE15V2 for example) as well as clock features (precision, oscillator drift for example) and synchronization enhancement supports (a.k.a on-path support);

applications requirements 12 in terms of temporal/frequential information, maximum number of hops, link load and cost for example. As an illustrative example, GSM and UMTS base stations must be frequency synchronized to +/−50 ppb to support handover as mobiles transition from one base station to another. Failure to meet the 50 ppb synchronization requirement will result in dropped calls.

The centralized database management system 1 is mainly configured to feed three functional modules, namely a filtering module 20 permitting to identify relevant (S, P, M) combinations;

an end-to-end PDV assessment module 30 permitting to assess pre-selected relevant (S, P, M) combinations; and a domain provisioning module 40 permitting to provision the retained (S, P, M) combination and to update the synchronization topology according to the output of the PDV assessment module 30.

Such functional modules may be implemented as management modules or within a Path Computation Element as per RFC4655.

The filtering module 20 is in charge of performing a computation on (S, P, M) combination and then outputting, according to a first selection, relevant ones. Relevant (S, P, M) combinations are to be assessed by the PDV assessment module 30 from PDV standpoint and the retained combination will be provisioned by the domain provisioning module 40.

Obviously, assessing all possible (S, P, M) triplets may be a complex task as it may require too much processing resources. Accordingly, the filtering module 20 achieves a pre-filtering mechanism on combinations candidates, aiming at reducing the combinations number.

Figure 2:
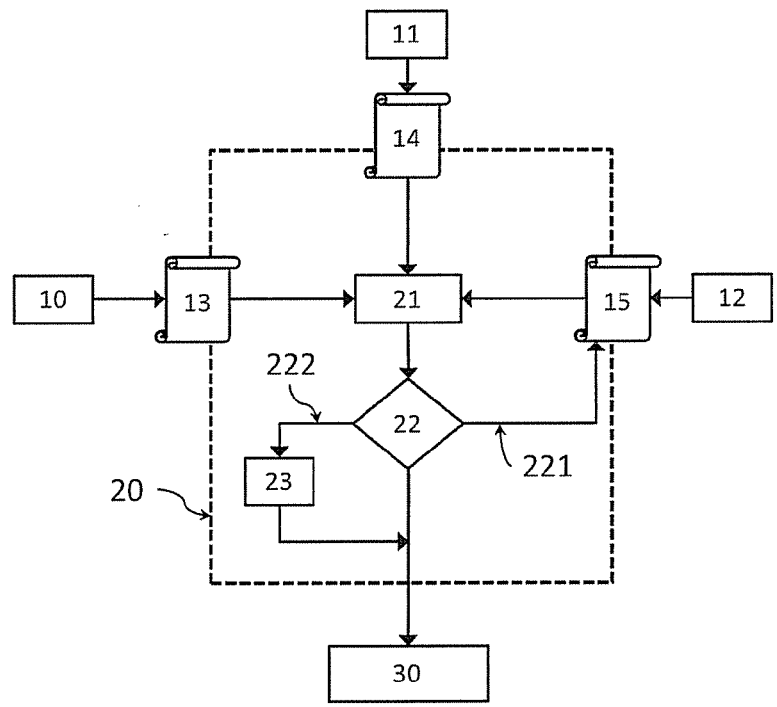
FIG. 2 is a schematic diagram illustrating the procedure enabling relevant (Slave, Path, Master) combinations computation.

With reference to FIG. 2, the pre-filtering mechanism is based on a plurality of engineering metrics 13 retrieved from the Traffic Engineering Database 10 (TED) such as the network topology, hop count, transmission performances (for examples propagation delay, link bandwidth, jitter, bit error rate), administrative weight and economic cost;

topological information 14 retrieved from the unified synchronization database 11 mainly comprising the Masters/Slaves topology which is established according to the currently used synchronization protocol;

a plurality of constraints 15 (typically engineering rules thanks to a given frequency requirement) such as maximum hop count, maximum network link load, and administrative weight/cost to be retrieved from applications requirements 12.

Engineering metrics 13, topological information 14 and constraints 15 serve as input for a computation step 21 which is in charge of computing relevant (S, P, M) combinations. Such computation step 21 aims at performing a pre-selection step on (S, P, M) combinations candidates on the basis of constraints 15. A (S, P, M) combination is considered relevant if it satisfies constraints 15 which are retrieved from the application requirements 12.

The output of the computation step 21 undergoes a predefined test 22 relating to the number of preselected (S, P, M) combinations. As an example, the test 22 may limit the number of (S, P, M) combinations to be at least 3 combinations and at most 6.

Subsequently, if the test 22 conditions are not met, because the (S, P, M) combinations number is too low (under a predefined number or no solution) (link 221 on FIG. 2), then the computation step 21 could be repeated by gradually relaxing/modifying constraints 15 (e.g. hop_number=hop_number+1, link_load=link_load−x %) until the predefined lower bound of relevant combinations number is reached or even exceeded; or because the (S, P, M) combinations number is too high (more than a predefined number) (link 222 on FIG. 2), then relevant combinations are filtered thanks to filtering stage 23 by using the precedence between metrics. The filtering stage 23 permits to retain the most relevant (S, P, M) combinations among those given by the computation step 21. Indeed, setting a ceiling for (S, P, M) combinations number permits to moderate the network resources which may be required by the following module; the PDV/delay assessment module 30.

As soon as the number of relevant (S, P, M) combinations satisfies the test 22 conditions, these combinations are transmitted to the PDV/delay assessment module 30.

The output of test 22 represents the result of the first selection step performed by the filtering module 20 and needed by the PDV assessment module 30.

The PDV assessment module 30 is in charge of assessing, in terms of PDV, relevant (S, P, M) combinations output by the filtering module 20.

The PDV assessment module 30 takes advantage on the fact that at a given reference time, all the slaves are locked to a reference frequency within predetermined accuracy ranges. As a non-limitative example, all IEEE1588V2 slaves are commonly frequency locked with an accuracy above 50 ppb (air interface) or 16 ppb (network interface) while assessing the other combinations (at t=t0). Then, instead of using probes, tolerances of Slaves clocks are utilized as reference for relevant (S, P, M) combinations assessment in terms of PDV/delay.

Figure 3:
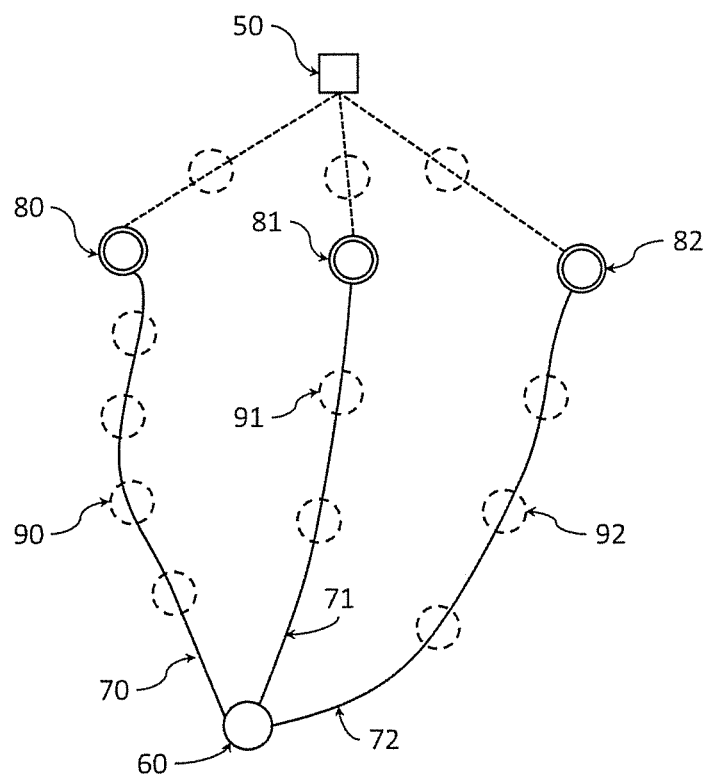
FIG. 3 is schematic diagram illustrating end-to-end PDV monitoring.

As an illustrative example shown in FIG. 3, three relevant (S, P, M) combinations are supposed to be assessed by the PDV/delay assessment module 30. Then, a Slave 60, three Masters 80-82 and three Paths 70-72 linking Slave 60, respectively, to Masters 80-82, resulting in three combination (S(60), P(70), M(80)), (S(60), P(71), M(81)), (S(60), P(72), M(82)), are shown. Obviously, each Path 70-72 may include a plurality of intermediates nodes 90-92.

It is assumed that the network topology is statically set up by the network operator at an initialization time t=t0 according to engineering rules and that all masters 80-82 are traceable to the same Primary Reference Clock (PRC) 50. Primary reference Clock 50 is a common precision timing (or frequency) reference from an accessible external source such as GPS.

The adopted methodology is an End-to-End one (from Slave to a Master, including intermediate nodes 90-92 as Ethernet switches, wire-speed routers, and software based routers). Then. PDV assessment takes into account intermediate node capabilities and performances in terms of latency.

It is to be noted that the ITU-T SG15 Q13 is investigating a limited set of metrics in order to efficiently monitor the (floor) Packet Delay/PDV dependency of timestamp-based synchronization protocols, particularly IEEE1588V2 protocol. Nevertheless, these metrics are dependent on traffic conditions (for example with or without QoS policies) and still need to be proven in real Networks for all conditions.

Consequently, all the statistical delay/PDV distribution has to be sized and monitored according to a predefined confidence range, it means by considering ones of several times statistical parameters (such as the standard deviation of the packet delay distribution or the "floor" packet delay variation window). The PDV/delay distribution is usually performed on large set of samples, usually about $10^4$ samples for an accurate assessment of the standard deviation. Herein described embodiments target a lower but still efficient value in terms of PDV assessment. In fact, herein described embodiments target about $10^3$ samples for a reasonable assessment of PDV confidence range (low probability packet such as packets experiencing a minimum delay—less than 1% of the packet delay distribution—should be represented within the statistics).

In fact, knowing that the packet clock is a 2-stage architecture with a first PDV filtering stage and a second Phase Locked Loop (PLL)-based stage; and that, in the case of wireless networks, a 16 ppb frequency accuracy requirement is usually targeted at the network interface in order to reach at most 50 ppb at the air interface level, so, for illustration, let's assume that all slave clocks have the same features;

consider, for the second (slave) stage, a low-cost Phase Lock Loop with a low-pass filtering of 10 mHz and a timing signal rate of 32 message/s, this leads to a PDV tolerance at the slave (PLL) input close to 20 µs; and consider a classical "one stage" filtering Moving Average (MA) with N=64 registers supported by a local clock demonstrating a "short" term clock stability of about $10^{-8}$ (typically over one day)

then, the PDV tolerance at the input of the first stage (and thus of the packet clock) is about 20 µs x$\sqrt{N}$, thus around 150 µs (noise averaging model).

Thus the assessment/filtering of (Slave, Path, Master) combinations has to be performed according to this 150 µs maximum PDV value (targeting a 16 bbp frequency accuracy). In order to efficiently compare (Slave, Path, Master) combinations, a time measurement error bellow 20 µs should be recommended (This maximum error could be aligned to the input tolerance of the second stage as well).

Accordingly, a low message rate of 1 message/s; and a clock with a 16 ppb accuracy and to which all paths have to be compared enable to catch a realistic delay/PDV distribution (1250 samples targeted in this case) with a maximum delay measurement error of 20 µs. (the measurement error on 1250 s for a 16 ppb clock accuracy is 20 µs)

Thus, a low signaling message rate—1 message/s here— along path 70-71 and a Slave 60 provided with a clock of 16 ppb frequency accuracy permit to assess the three combinations shown on FIG. 3 with an accuracy of 20 µs while using only 1250 samples.

Hence an already accurately locked Slave clock can be used as a probe for assessing the PDV distribution of (Slave, Path, Master) relevant combinations.

As the measurement principle relies on Paths identifiers, the measurement sequence requires, for instance, the use of tunneling techniques.

Once obtained, the assessed PDV distribution enables to perform an ultimate selection of best (Slave, Path, Master) combinations in terms of PDV (and thus in terms of expected performance). This selection enables to reject non-relevant measurements and thus to release non-relevant tunnels. It is to be noted that the tunneling constraints are low in term of bandwidth as PDV assessment/measurement sequence are supposed to be performed thanks to a monitoring approach (for example, a PDV assessment over one day each 15 days could be imagined as a typical monitoring).

In an embodiment, selected combinations can be labeled according to 2 sets of identifiers associated to the source (Master)—(Master_ID)—and the Path linking this source to the destination (Slave)—(Path_ID). Then, each slave may be associated to its corresponding couple of identifiers (Path_ID, MASTER_ID).

It is to be noted that the filtering module 20 and the PDV assessment module 30 use profiles which are operator configurable. For instance, the first Traffic Engineering Database—based computation could be periodically performed (every about 15 days for example) whereas PDV assessment module 30 could be performed over high traffic load conditions (busy hours—the period during which the maximum total traffic load occurs) each few days (several PDV distributions each 15 days for example).

Once the best (S, P, M) combination is selected among relevant (S, P, M) combinations by the PDV assessment module 30, it is communicated to the provisioning module 40.

The best (S, P, M) combination should be selected on the basis of End-to-End PDV assessment (operator constrains have to be taken into account as well). It is the one which has the lowest End-to-End PDV, the one which meets (according to filtering algorithms of the first stage packet clock) the most stringent time/frequency alignment accuracy and does not undermine the accuracy of time/frequency transfer.

In an embodiment, the PDV assessment module 30 has to sort out (S, P, M) combinations in functions of PDV, from lowest to highest. Then, the sorted relevant (S, P, M) combinations are transferred to a management system for synchronization domains updating.

The synchronization manager or the network manager then provisions the Domains identifiers (Domain_ID) for all clocks. This provisioning could be performed through other means, such as the configuration of Acceptable_Master Tables in the case of IEEE 1588V2 slave clocks. The synchronization network is thus automatically organized per PDV domain.

In one embodiment, the firstly-ranked (S, P, M) combination is replaced by the secondly-ranked regarding failure events, such as Path P or Master M altered, or thanks to Master (/server) load balancing constraints.

Based on the PDV knowledge, synchronization protocol domains are computed accordingly at the synchronization management or network management levels by the domain provisioning module 40.

It is to be noted that the herein described method should be validated for the first time by the network operator, especially if the proposed domain organization does not match the synchronization hierarchy built by means of engineering rules.

As a migration way towards automatic synchronization management, the obtained domain organization should only affect the protection scheme (backup combinations) by the provisioning of redundant masters in identified domains. In any case, the network operator has the full control of the network and can maintain (or not) the autonomous monitoring.

The above described methods may be applied so that Masters/Slaves make provision for this, regardless of the used synchronization protocol. Then, herein described embodiment may be easily generalized, considering multi-protocol synchronization schemes. This generalization may be achieved through providing the unified synchronization database 11 with all synchronization protocols/technologies as well as their associated features. Together Synchronous Ethernet, IEEE 1588V2 and NTP may be considered in the filtering procedure of relevant (Slave, Path, Master) combinations.

Advantageously, herein described embodiments enables End-to-End PDV management and self configuration of an optimized domain-structured timing hierarchy. These embodiments provide flexible and robust synchronization networks and reduce the need for "per-hop" approaches (wherein each node is a protocol support), solving the PDV issues at the expense of additional hardware.

The invention claimed is:

1. A method for automatic management of a timestamp-based synchronization protocol within a packet-based network to synchronize a slave within a synchronization topology including a plurality of masters and a plurality of paths linking the slave to two or more of the plurality of masters, a slave clock being locked to a master clock at an initialization time, said method executed by a processor and comprising: an assessment step of end-to-end packet delay variation on the basis of the slave clock accuracy, over a plurality of (slave, path, master) combinations, each path linking the slave to one of the two or more of the plurality of masters, wherein the (slave, path, master) combinations are sorted in function of end-to-end packet delay variation.

2. The method of claim 1, further comprising a pre-selection step of relevant (slave, path, master) combinations.

3. The method of claim 2, wherein the number of relevant (slave, path, master) combinations is bounded between a first threshold and a second threshold.

4. The method of claim 3, wherein if the number of relevant combinations is below the first threshold or above the second threshold, the assessment step is repeated such that the number of relevant (slave, path, master) combinations is bounded between a first threshold and a second threshold.

5. The method of claim 2, wherein the pre-selection step is repeated as long as the number of relevant (slave, path, master) combinations is inferior to a predefined minimum number by regularly relaxing the synchronization constraints.

6. The method of claim 2, wherein a filtering stage is applied to keep the number of relevant (slave, path, master) combinations inferior to a predefined maximum number.

7. The method of claim 1, further comprising a provisioning step for the selected (slave, path, master) combination according to the assessment step.

8. An apparatus for automatic management of a timestamp-based synchronization protocol within a packet-based network to synchronize a slave within a synchronization topology including a plurality of masters and a plurality of paths linking the slave to two or more of the plurality of masters, a slave clock being locked to a master clock at an initialization time, said apparatus comprising: a centralized database system provided with a traffic engineering database, a unified synchronization database including at least a synchronization topology, and at least a topological requirements; an end-to-end packet delay variation assessment module for end-to-end packet delay variation assessment on the basis of the slave clock accuracy, over a plurality of (slave, path, master) combinations, each path linking the slave to one of the two or more of the plurality of masters; and a filtering module permitting to identify relevant (slave, path, master) combination to be assessed on the basis of the end-to-end packet delay variation.

9. The apparatus of claim 8, further comprising:
a packet delay variation domain provisioning module for provisioning the output of the end-to-end packet delay variation assessment module.

* * * * *